(12) United States Patent
Guo

(10) Patent No.: US 12,388,917 B1
(45) Date of Patent: Aug. 12, 2025

(54) FOLDABLE MOBILE PHONE PROTECTOR

(71) Applicant: Tian

(72) Inventor: Weihao Guo, Shenzhen (CN)

( * ) Notice: Subject to any disclaimer, the term of this patent is extended or adjusted under 35 U.S.C. 154(b) by 0 days.

(21) Appl. No.: 19/008,626

(22) Filed: Jan. 2, 2025

(51) Int. Cl.
*H04M 1/02* (2006.01)

(52) U.S. Cl.
CPC .................. *H04M 1/0203* (2025.01)

(58) Field of Classification Search
CPC ..... H04M 1/0203; H04M 1/04; A45C 11/003; A45C 2013/025; A45C 13/002; G06F 1/1628
See application file for complete search history.

(56) References Cited

U.S. PATENT DOCUMENTS

| | | | | |
|---|---|---|---|---|
| D892,107 S | * | 8/2020 | Zhao ........................... | D14/250 |
| 11,063,626 B2 | | 7/2021 | Luo et al. | |
| D1,051,114 S | * | 11/2024 | Choi ........................... | D14/250 |
| 2012/0111755 A1 | * | 5/2012 | Harata .................. | H04M 1/0214 |
| | | | | 206/472 |
| 2013/0270980 A1 | * | 10/2013 | Hsu ........................ | G06F 1/1628 |
| | | | | 312/223.1 |
| 2014/0030474 A1 | * | 1/2014 | Hsu ........................ | A45C 11/00 |
| | | | | 428/189 |

FOREIGN PATENT DOCUMENTS

| | | | | |
|---|---|---|---|---|
| JP | 2972622 B2 | * | 11/1999 | |
| WO | WO-2021162455 A1 | * | 8/2021 | ............. A45C 11/00 |

* cited by examiner

*Primary Examiner* — Quoc Thai N Vu
(74) *Attorney, Agent, or Firm* — Ying-Ting Chen; Law Office of Michael Chen

(57) ABSTRACT

A foldable mobile phone protector includes a mobile phone case, an outer cover and a connecting part; wherein the mobile phone case comprises a secondary case and a main case, the outer cover comprises a secondary cover and a main cover, and the connecting part comprises an elastic band and a flexible protective layer. The outer cover and the connecting part of the foldable mobile phone protector are both connected by sewing, and the sewing process can be completed at one time, this sewing design does not require a complicated production process, and provided in high production efficiency and low production cost. When the elastic band is in a stretched state, the flexible protective layer extends out of the main cover through the opening and covers the folding seam of the foldable mobile phone.

10 Claims, 5 Drawing Sheets

FOLDABLE MOBILE PHONE PROTECTOR

FIELD OF THE INVENTION

The invention relates to the technical field of foldable mobile phone accessories, and in particular to a foldable mobile phone protector.

BACKGROUND OF THE INVENTION

A foldable mobile phone is an innovative smartphone that allows it to unfold into a tablet form during use, and transform into a smaller phone form when folded. Foldable mobile phones are usually provided with a main screen and a secondary screen, where the main screen is the main display area, suitable for multitasking and viewing content, while the secondary screen is usually provided on the outside, used to quickly check notifications, time or perform simple operations, so that users can use it in a folded state. It can be seen that compared with traditional mobile phones, foldable mobile phones not only add a secondary screen, but also introduce foldable components, making the hardware configuration more diverse and the structure more complex. Therefore, it is particularly important to equip foldable phones with protectors, which can effectively prevent foldable mobile phones from scratches, collisions and other damage, thereby extending their service life. There are currently a wide variety of foldable phones on the market, users change their phones frequently, the update speed of accessories is also faster, so merchants continue to launch new foldable mobile phones and accessories to meet people's increasingly diverse needs. In this case, how to manufacture mobile phone case accessories with stronger adaptability and lower prices has become a new technical challenge faced by technicians in this field.

SUMMARY OF THE DISCLOSURE

In view of this, the present invention provides a foldable mobile phone protector, aiming to improve the adaptability and reduce production costs of the foldable mobile phone protector.

The present invention provides a foldable mobile phone protector, comprising a mobile phone case, an outer cover and a connecting part, wherein:

The mobile phone case includes a secondary case for protecting and limiting the secondary screen of the foldable mobile phone and a main case for protecting and limiting the main screen of the foldable mobile phone, wherein the secondary case and the main case are separately provided on the left and right sides;

The outer cover comprises a secondary cover and a main cover which are separately provided on the left and right sides, the secondary cover is fixedly connected to the bottom of the secondary case, the main cover is fixedly connected to the bottom of the main case, and both the secondary cover and the main cover are double-layer structures. The main cover is provided with an opening near the edge of the secondary cover, and all edges of the outer cover except the edge corresponding to the opening are sewn by stitches;

The connecting part includes an elastic band and a flexible protective layer, both of which are provided in the interlayer of the double-layer structure of the main cover, one end of the elastic band is sewn to the edge of the main cover by stitches, the other end of the elastic band and one end of the flexible protective layer are sewn by stitches, and the other end of the flexible protective layer extends out of the main cover through the opening and is sewn to the edge of the secondary cover close to the main cover by stitches;

When the foldable mobile phone is installed in the mobile phone protector and is in a folded state, the secondary cover and the main cover are arranged opposite to each other up and down, the elastic band is in a stretched state, and the flexible protective layer extends out of the main cover through the opening and covers the folding seam of the foldable mobile phone;

When the foldable mobile phone is installed in the mobile phone protector and is in an unfolded state, the secondary cover and the main cover are arranged opposite to each other on the left and right, the flexible protective layer is retracted into the main cover through the opening, and the elastic band is in a reset state.

In a possible embodiment, the mobile phone case is a hard case, and the flexible protective layer includes a natural leather layer and a synthetic leather layer In a possible embodiment, the double-layer structure includes a leather layer and a foam layer, and the foam layer is provided between the leather layer and the mobile phone case.

In a possible embodiment, an adhesive layer is provided between the foam layer and the mobile phone case.

In a possible embodiment, the main cover further includes a buckle part, the buckle part comprises an ring buckle and a fixing ear, the fixing ear covers a portion of the ring buckle and is sewn to the edge of the leather layer through a sewing line, and the buckle part is located in the middle position of the main cover near the edge of the secondary cover;

The ring buckle is a closed ring; or

The ring buckle includes a ring arm and a rotating arm, the ring arm is provided with a hinge shaft, the rotating arm is hinged to the ring arm through the hinge shaft, and the rotating arm can rotate around the hinge shaft to open or close the ring buckle.

In a possible embodiment, the fixing ears are leather ears.

In a possible embodiment, the height of the elastic band is smaller than the height of the flexible protective layer, and the height of the flexible protective layer is smaller than the height of the main cover.

In a possible embodiment, the secondary cover is provided with a frame having a visible window.

In a possible embodiment, the main cover is provided with at least one of a camera hole, a flash hole, a charging port hole and a button hole.

In a possible embodiment, the cross-sectional area of the secondary cover is larger than the cross-sectional area of the secondary case, and the cross-sectional area of the main cover is larger than the cross-sectional area of the main case.

Compared with the prior art, the beneficial effects of the present invention are as follows: a foldable mobile phone protector, including a mobile phone case, an outer cover and a connecting part; wherein the mobile phone case includes a secondary case and a main case, the outer cover comprises a secondary cover and a main cover, both the secondary cover and the main cover are provided in double-layer structures, the main cover is provided with an opening near the edge of the secondary cover, and all edges of the outer cover except the edge position corresponding to the opening are sewn by stitches; the connecting part includes an elastic band and a flexible protective layer, one end of the elastic band is sewn to the edge of the main cover by stitches, the other end of the elastic band and one end of the flexible protective layer are sewn by stitches, and the other end of the flexible protective layer extends out of the main cover through the opening and is sewn to the edge of the secondary cover near the main cover by stitches. It can be seen that the outer cover and the connecting part of the foldable mobile phone protector are connected by sewing, and the sewing process can be completed at one time. This sewing design does not require a complicated production process, and provided in high production efficiency and low production cost. When the foldable mobile phone is installed in the mobile phone protector and is in a folded state, the secondary cover and the main cover are arranged opposite to each other up and down, the elastic band is in a stretched state, and the flexible protective layer extends out of the main cover through the opening and covers the folding seam of the foldable mobile phone; when the foldable mobile phone is installed in the mobile phone protector and is in an unfolded state, the secondary cover and the main cover are arranged opposite to each other on the left and right, the flexible protective layer is retracted into the main cover through the opening, and the elastic band is in a reset state. Compared with the traditional hard foldable mobile phone protector that needs to be precisely designed for specific mobile phone models and thicknesses, the elastic band can be freely stretched and retracted within a certain range, when elastic band is used in conjunction with the flexible protective layer, it can adapt to foldable mobile phones of various models and different thicknesses without a complicated mechanical connection structure, effectively covering different folding seams, avoiding wear or damage caused by the folding seams being exposed to the outside, and having a wider adaptability. In addition, the cost of the elastic band is low, which can further reduce the production cost of the foldable mobile phone protector.

DETAILED DESCRIPTION OF THE PREFERRED EMBODIMENTS

Figure 1:
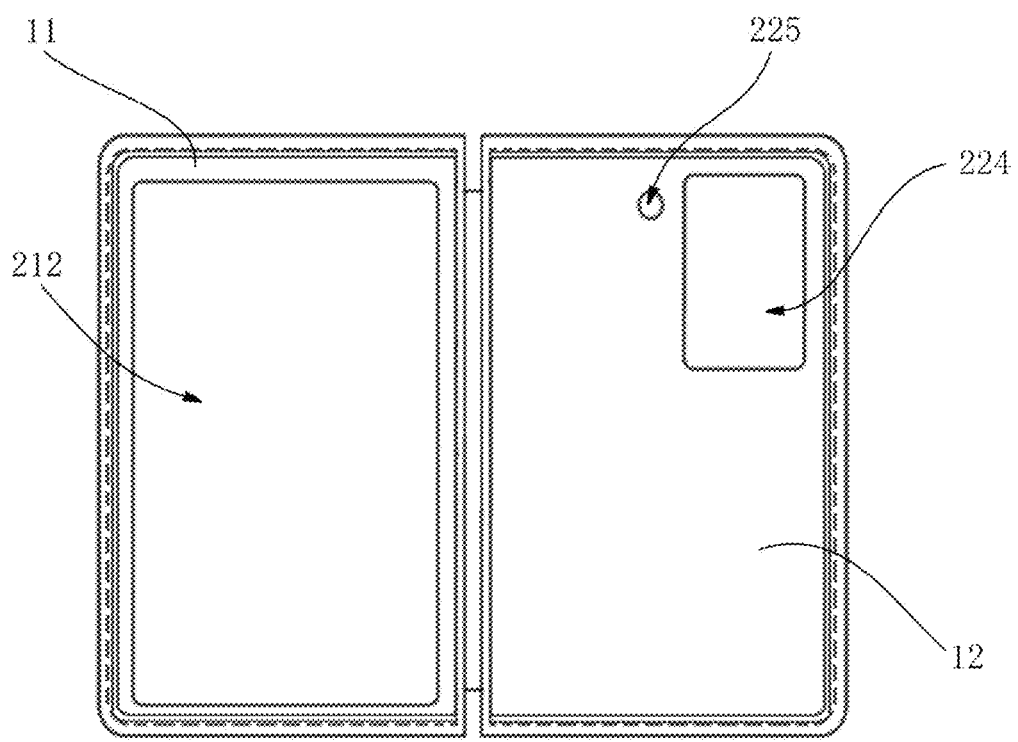
FIG. 1 is a front structural view of the foldable mobile phone protector when the elastic band is in a reset state provided by an embodiment of the present invention.
Figure 2:
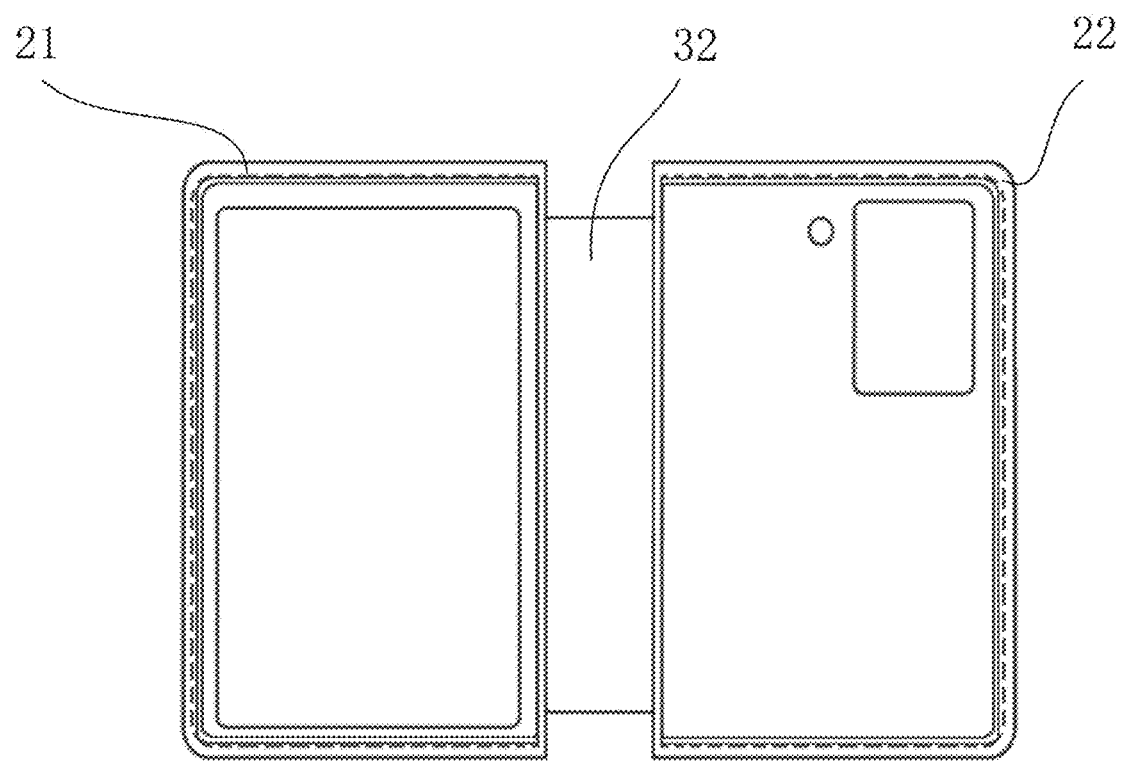
FIG. 2 is a front structural view of the foldable mobile phone protector when the elastic band is in a stretched state provided by an embodiment of the present invention.
Figure 3:
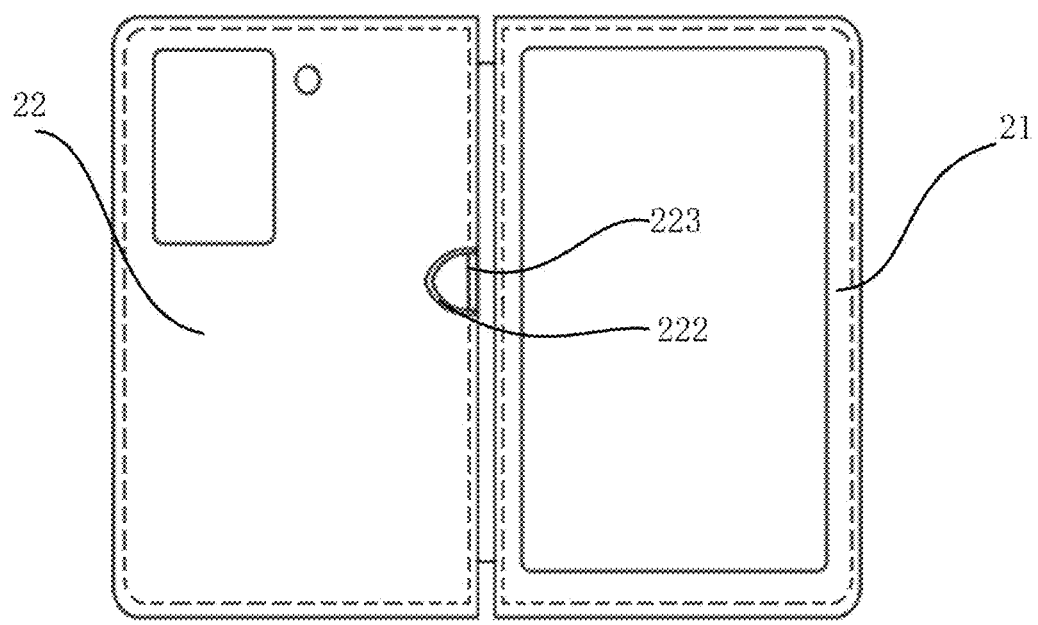
FIG. 3 is a back structural view of the foldable mobile phone protector when the elastic band is in a reset state provided by an embodiment of the present invention.
Figure 4:
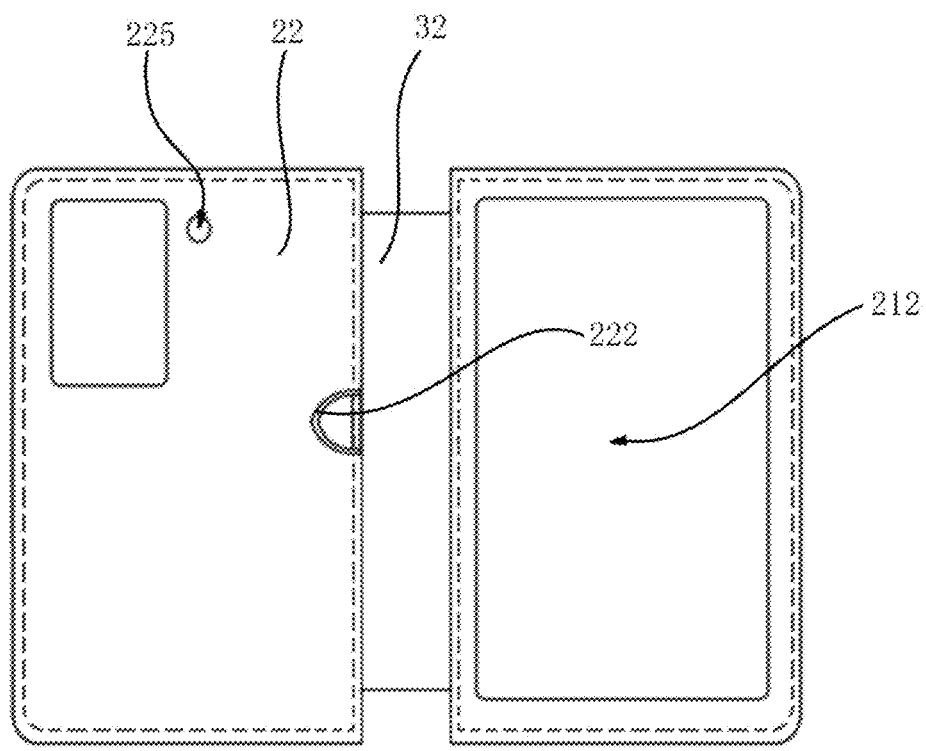
FIG. 4 is a back structural view of the foldable mobile phone protector when the elastic band is in a stretched state provided by an embodiment of the present invention.

Other features, objects and advantages of the present invention will be more clearly and completely by the detailed description of the non-limiting embodiments with reference to the attached drawings (FIG. 1 to FIG. 5). Obviously, the described embodiments are only part of the embodiments of the present invention, but not all of them. Based on the embodiments of the present invention, all other embodiments obtained by ordinary technicians in the field without creative labor are within the scope of the present invention.

In the present invention, the use of orientation words such as "front", "back" are "up, "down", "left", "right" only for the convenience of description, rather than indicating or implying the specific orientation, therefore it should not be construed as being limited to the description of the following embodiments.

In addition, it should be noted that the terms "main", "secondary" and the like in the description and claims of the present invention and the above drawings are used to distinguish similar objects, which are not necessarily used to describe the specific order or sequence. It is to be understood that the data so used are interchangeable under appropriate circumstances in order to describe the embodiments of the invention herein.

Please refer to FIGS. 1-5, the present invention provides a foldable mobile phone protector including a mobile phone case, an outer cover and a connecting part. Wherein:

The mobile phone case includes a secondary case 11 for protecting and limiting the secondary screen of the foldable mobile phone and a main case 12 for protecting and limiting the main screen of the foldable mobile phone, and the secondary case 11 and the main case 12 are separately provided on the left and right;

The outer cover comprises a secondary cover 21 and a main cover 22 which are separately provided on the left and right sides, the secondary cover 21 is fixedly connected to the bottom of the secondary case 11, the main cover 22 is fixedly connected to the bottom of the main case 12, and both the secondary cover 21 and the main cover 22 are provided in double-layer structures. The main cover 22 is provided with an opening near the edge of the secondary cover 21 and edges of the outer cover except the edge corresponding to the opening are sewn by stitches;

The connecting part includes an elastic band 31 and a flexible protective layer 32, both of which are provided in the interlayer of the double-layer structure of the main cover 22, one end of the elastic band 31 is sewn to the edge of the main cover 22 by stitches, the other end of the elastic band 31 and one end of the flexible protective layer 32 are sewn by stitches, and the other end of the flexible protective layer 32 extends out of the main cover 22 through the opening and is sewn to the edge of the secondary cover 21 close to the main cover 22 by stitches;

When the foldable mobile phone is installed in the mobile phone protector and is in a folded state, the secondary cover 21 and the main cover 22 are arranged opposite to each other up and down, the elastic band 31 is in a stretched state, and the flexible protective layer 32 extends out of the main cover 22 through the opening and covers the folding seam of the foldable mobile phone;

When the foldable mobile phone is installed in the mobile phone protector and is in an unfolded state, the secondary cover 21 and the main cover 22 are arranged opposite to each other on the left and right, the flexible protective layer 32 is retracted into the main cover 22 through the opening, and the elastic band 31 is in a reset state.

Specifically, the foldable mobile phone protector is designed in a flexible way. The manufacturing process can be completed by simply installing the outer cover and the connecting part on the mobile phone case (the mobile phone case can be designed by itself or can be selected from ready-made products according to needs). Except for the edge corresponding to the opening of the main cover 22 in the outer cover, the other edges and connecting parts of the outer cover are connected by sewing. This stitching joint method does not require a complex mechanical connection structure, and the production process of is extremely simplified, which can significantly reduce production costs and production time, and improve production efficiency. In addition, the cost of the elastic band 31 is low, and combined with the simplified production process, the production cost of the foldable mobile phone protector is further reduced, making it more competitive in the market. Since the elastic band 31 can be freely stretched and stretched within a certain range, the flexible protective layer 32 connected thereto can be adapted to foldable mobile phones of various models and different thicknesses, avoiding application limitations and improving its adaptability. Furthermore, by adjusting the position of the sewing line on the elastic band 31, the extension range of the flexible protective layer 32 can be further adjusted to enhance the adaptability of the foldable mobile phone protector. After the foldable mobile phone is installed in the foldable mobile phone protector, when the foldable mobile phone is in the folded state, the elasticity of the elastic band 31 enables the flexible protective layer 32 to be closely attached to the folding seam of the foldable mobile phone, achieving an effective covering effect, avoiding wear or damage caused by the folding seam being exposed to the outside, thereby improving the overall protection effect of the foldable mobile phone. Therefore, the foldable mobile phone protector not only meets the protection needs of the foldable mobile phone in terms of function, but also provides significant advantages in production and price, and has a good market prospect.

Compared with the prior art, the foldable mobile phone protector proposed in this embodiment, wherein the outer cover and the connecting part are connected by sewing, and the sewing process can be completed at one time. This sewing design does not require a complicated production process, and provided in high production efficiency and low production cost. Compared with the traditional hard foldable mobile phone protector that needs to be precisely designed for a specific mobile phone model and thickness, the elastic band 31 can be freely stretched and retracted within a certain range, when elastic band 31 is used in conjunction with the flexible protective layer 32, it can adapt to foldable mobile phones of various models and different thicknesses without a complicated mechanical connection structure, effectively covering different folding seams, avoiding wear or damage caused by the folding seams being exposed to the outside, and having a wider adaptability. In addition, the cost of the elastic band 31 is low, and the production cost of the foldable mobile phone protector can be further reduced.

In some embodiments of the present application, the mobile phone case is a hard case, and the flexible protective layer 32 includes a natural leather layer and a synthetic leather layer.

Specifically, the mobile phone case is a hard case, which can effectively resist external impact, protect the foldable mobile phone from physical damage, reduce the risk of screen breakage and internal component damage, and effectively make up for the deficiencies in the protection performance of the outer cover and the connection part. The combination of the mobile phone case, the outer cover and the connection part can form a comprehensive protection system, which not only enhances the impact resistance of the foldable mobile phone, but also provides better adaptability and flexibility, making the foldable mobile phone safer and more reliable in daily use. At the same time, the durability of the hard case and the flexible design of the outer cover can meet the user's dual needs for protecting the foldable mobile phone and having aesthetics, and enhance the overall user experience.

Specifically, the materials commonly used for hard cases include polycarbonate (PC), polypropylene (PP), aluminum alloy and stainless steel. These materials have different properties: polycarbonate has excellent impact resistance and heat resistance, polypropylene is lightweight and chemically resistant, aluminum alloy provides a balance between strength and lightness, and stainless steel has excellent corrosion resistance and strength. In terms of flexible protective layer 32, the natural leather layer can be made of cowhide, sheepskin or pigskin, providing different wear resistance and comfort; the synthetic leather layer is mainly composed of polyurethane (PU) leather, polyvinyl chloride (PVC) leather and recycled leather, the former has good wear resistance and waterproofness, while the latter is economical and durable. In practical application, material selection can be made according to product positioning and market demand to achieve the best protection effect and user experience.

In some embodiments of the present application, the double-layer structure includes a leather layer and a foam layer, and the foam layer is provided between the leather layer and the mobile phone case.

Specifically, the leather layer includes a natural leather layer and a synthetic leather layer. The foam layer can effectively absorb external impact force, reduce direct damage to the foldable mobile phone, and provide buffer protection for the foldable mobile phone. In addition, during the sewing process, the foam layer can also provide support for the leather layer, maintain its shape, and make the sewing process smoother and more stable.

In some embodiments of the present application, an adhesive layer is provided between the foam layer and the mobile phone case.

Specifically, the production process of the adhesive layer is relatively simple and easy to implement, and the foam layer can be effectively fixed and connected with the and the mobile phone case. Besides, there are more ways to connect the foam layer and the mobile phone case, for example, the foam layer and the mobile phone case can also be bonded by hot pressing technology, etc., which will not be elaborated here.

In some embodiments of the present application, the main cover 22 further includes a buckle part, the buckle part includes an ring buckle 222 and a fixing ear 223, the fixing ear 223 covers a portion of the ring buckle 222 and is sewn to the edge of the leather layer through a sewing line, and the buckle part is located in the middle position of the main cover 22 close to the edge of the secondary cover 21;

The ring buckle 222 is a closed ring; or

The ring buckle 222 includes a ring arm and a rotating arm, the ring arm is provided with a hinge shaft, the rotating arm is hinged to the ring arm through the hinge shaft, and the rotating arm can rotate around the hinge shaft to open or close the ring buckle 222.

Specifically, the setting of the buckle part effectively enhances the function of the foldable mobile phone protector. When the user inserts finger into the ring buckle 222, it can provide additional support, making the process of holding the foldable mobile phone more comfortable and stable. In addition, the user can easily open the ring buckle 222 through the rotating arm, conveniently hang various accessories and add personalized elements on the foldable mobile phone, which could meet the diversified needs of users and thus enrich the overall user experience. By sewing the fixing ear 223 to the leather layer of the main cover 221, the fixing of the ring buckle 222 can be effectively completed. This sewing process can be completed at one time together with the sewing process of the outer cover, without adding additional sewing processes, simplifying the production process and improving production efficiency.

In some embodiments of the present application, the fixing ears 223 are leather ears.

Specifically, the fixing ears 223 can be made of leather ears that are consistent with the leather material of the outer cover to ensure the coordination and aesthetics of the overall design and enhance the visual appeal of the foldable mobile phone protector.

In some embodiments of the present application, the height of the elastic band 31 is smaller than the height of the flexible protective layer 32, and the height of the flexible protective layer 32 is smaller than the height of the main cover 22.

Figure 5:
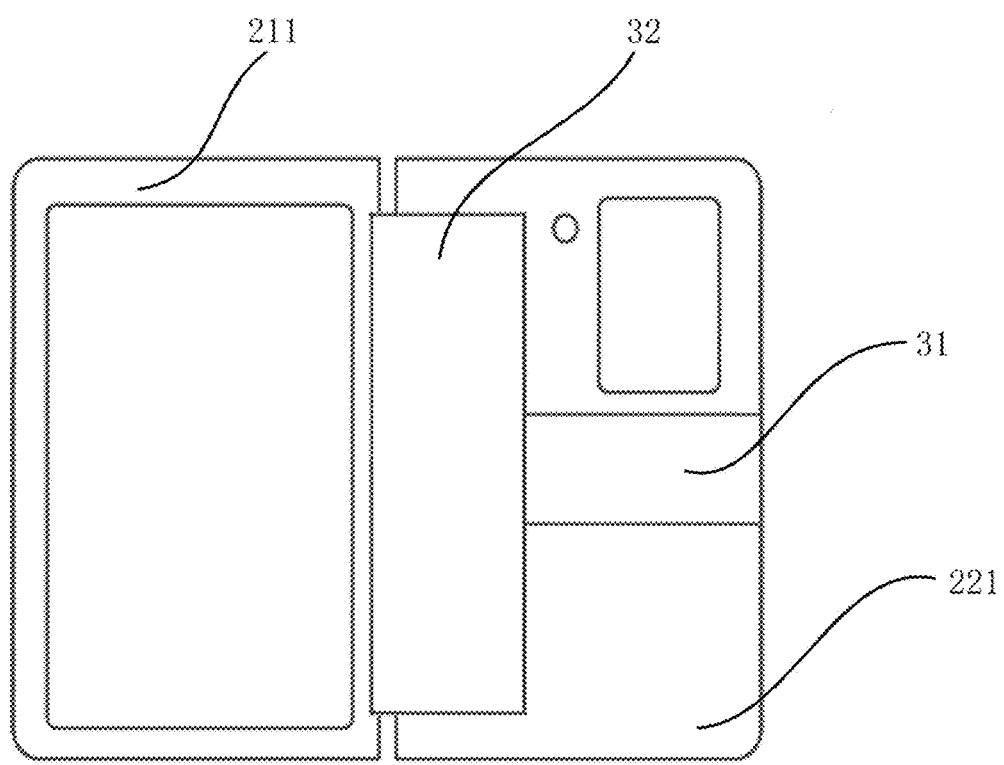
FIG. 5 is a schematic structural view of the connection between the outer cover and the connecting part when the outer cover is not provided with foam layer.

Specifically, the positional relationship between the outer cover of the foldable mobile phone protector and the connecting part when the foam layer is not provided is shown in FIG. 5, the leather layer of the secondary cover 211, the leather layer of the main cover 221, the elastic band 31 and the flexible protective layer 32 are shown in FIG. 5, and in this time, the outer cover and the connecting part are not sewn. Firstly, adjust the position of the leather layer and the connecting part to the right position, then place the foam layer in the predetermined position, and then a one-time sewing process can be performed. Specifically, the sewing of the elastic band 31 and the flexible protective layer 32 can be completed first, and then the sewing of the flexible protective layer 32 and the outer cover can be completed. The entire sewing process does not need to be interrupted, and all sewing operations are completed at one time in the same production process. If necessary, the sewing process of the fixing ear 223 can also be completed in this process. As shown in FIG. 5, the narrow elastic band 31 can ensure that the camera hole 224 and the flash hole 225 reserved in the main cover 22 are not blocked. The wide flexible protective layer 32 can better cover the folding seam area, thereby enhancing the durability of the foldable mobile phone during use. However, the width of the flexible protective layer 32 cannot exceed that of the main cover 22 to ensure that the smooth extension and retraction of the flexible protective layer 32 at the opening.

In some embodiments of the present application, the secondary cover 21 is provided with a frame 212 with a visible window.

Specifically, the secondary cover 21 is provided with a frame 212 with a visible window, which enables the user to conveniently view important information on the screen, such as time, notifications, and incoming call information, when the foldable mobile phone is in a folded state.

In some embodiments of the present application, the main cover 22 is provided with at least one of a camera hole 224, a flash hole 225, a charging port hole and a button hole.

Specifically, the reserved holes of the main cover 22 are flexible and diverse. Through precise hole layout, the foldable mobile phone protector can protect the foldable mobile phone while ensuring the normal use of its various functions.

In some embodiments of the present application, the cross-sectional area of the secondary cover 21 is larger than the cross-sectional area of the secondary case 11, and the cross-sectional area of the main cover 22 is larger than the cross-sectional area of the main case 12.

Specifically, the edge of the outer cover has more space than the edge of the mobile phone case, so that the outer cover can provide more comprehensive protection for the edges and corners of the mobile phone case, thereby improving the safety of the foldable mobile phone protector and reducing damage caused by falls or collisions. In addition, a larger outer cover can increase the contact area with the palm, improve the stability of the holding, and reduce the risk of slipping. It should be noted that the edge of the main cover 22 close to the secondary cover 21 can be flush with the corresponding edge of the main case 12, and the edge of the secondary cover 21 close to the main cover 22 can also be flush with the corresponding edge of the secondary case 11. This design can ensure that when the foldable mobile phone is in the unfolded state, the folding seam can be closed normally, allowing users to use the various functions of the foldable mobile phone smoothly without being interfered by the outer cover.

The foldable mobile phone protector provided in this embodiment has the characteristics of simple structure and flexible use, which can meet the dual needs of users for mobile phone protection and high adaptability, and provides an economical and affordable protection solution for foldable mobile phones on the market.

Hereinafter, embodiments of the present invention have been described in detail with reference to the accompanying drawings. While the description above refers to the particular embodiments of the present invention, it will be understood that many modifications may be made without departing from the spirit thereof. Any equivalent replacement or modification would fall within the protection scope of the present invention.

What is claimed is:

1. A foldable mobile phone protector, comprising a mobile phone case, an outer cover and a connecting part, wherein the mobile phone case includes a secondary case for protecting and limiting the secondary screen of the foldable mobile phone and a main case for protecting and limiting the main screen of the foldable mobile phone, wherein the secondary case and the main case are separately provided on the left and right sides;

wherein the outer cover comprises a secondary cover and a main cover which are separately provided on the left and right sides, the secondary cover is fixedly connected to the bottom of the secondary case, the main cover is fixedly connected to the bottom of the main case, and both the secondary cover and the main cover are double-layer structures; the main cover is provided with an opening near the edge of the secondary cover, and edges of the outer cover except the edge corresponding to the opening are sewn by stitches;

wherein the connecting part includes an elastic band and a flexible protective layer, both of which are provided in the interlayer of the double-layer structure of the main cover, one end of the elastic band is sewn to the edge of the main cover by stitches, the other end of the elastic band and one end of the flexible protective layer are sewn by stitches, and the other end of the flexible protective layer extends out of the main cover through the opening and is sewn to the edge of the secondary cover close to the main cover by stitches; when the foldable mobile phone is installed in the mobile phone protector and is in a folded state, the secondary cover and the main cover are arranged opposite to each other up and down, the elastic band is in a stretched state, and the flexible protective layer extends out of the main cover through the opening and covers the folding seam of the foldable mobile phone; and when the foldable mobile phone is installed in the mobile phone protector and is in an unfolded state, the secondary cover and the main cover are arranged opposite to each other on the left and right, the flexible protective layer is retracted into the main cover through the opening, and the elastic band is in a reset state.

2. The foldable mobile phone protector according to claim 1, wherein the mobile phone case is a hard case, and the flexible protective layer includes a natural leather layer and a synthetic leather layer.

3. The foldable mobile phone protector according to claim 1, wherein the double-layer structure includes a leather layer and a foam layer, and the foam layer is provided between the leather layer and the mobile phone case.

4. The foldable mobile phone protector according to claim 3, wherein an adhesive layer is provided between the foam layer and the mobile phone case.

5. The foldable mobile phone protector according to claim 3, wherein the main cover further includes a buckle part, the buckle part comprises a ring buckle and a fixing ear, the fixing ear covers a portion of the ring buckle and is sewn to the edge of the leather layer through a sewing line, and the buckle part is located in the middle position of the main cover near the edge of the secondary cover; wherein the ring buckle includes a ring arm and a rotating arm, the ring arm is provided with a hinge shaft, the rotating arm is hinged to the ring arm through the hinge shaft, and the rotating arm can rotate around the hinge shaft to open or close the ring buckle.

6. The foldable mobile phone protector according to claim 5, wherein the fixing ears are leather ears.

7. The foldable mobile phone protector according to claim 1, wherein the height of the elastic band is smaller than the height of the flexible protective layer, and the height of the flexible protective layer is smaller than the height of the main cover.

8. The foldable mobile phone protector according to claim 1, wherein the secondary case is provided with a frame having a visible window.

9. The foldable mobile phone protector according to claim 1, wherein the main cover is provided with at least one of a camera hole, a flash hole, a charging port hole and a button hole.

10. The foldable mobile phone protector according to claim 1, wherein the cross-sectional area of the secondary cover is larger than the cross-sectional area of the secondary case, and the cross-sectional area of the main cover is larger than the cross-sectional area of the main case.

* * * * *